United States Patent [19]

Friedow

[11] Patent Number: 5,135,292
[45] Date of Patent: Aug. 4, 1992

[54] DRIVE SLIP CONTROL SYSTEM HAVING ELECTRICALLY AND HYDRAULICALLY CONTROLLED VALVES

[75] Inventor: Michael Friedow, Tamm, Fed. Rep. of Germany

[73] Assignee: Robert Bosch GmbH, Stuttgart, Fed. Rep. of Germany

[21] Appl. No.: 585,168

[22] PCT Filed: Mar. 21, 1989

[86] PCT No.: PCT/EP89/00307
§ 371 Date: Nov. 26, 1990
§ 102(e) Date: Nov. 26, 1990

[87] PCT Pub. No.: WO89/09711
PCT Pub. Date: Oct. 19, 1989

[30] Foreign Application Priority Data

Apr. 15, 1988 [DE] Fed. Rep. of Germany ....... 3812569

[51] Int. Cl.$^5$ ............................................. B60T 8/62
[52] U.S. Cl. ...................... 303/113 TR; 303/DIG. 5; 303/DIG. 6
[58] Field of Search ...... 303/113 R, 113 TR, 113 SS, 303/115 EL, 116 R, 116 SP, 119 R, 119 SV, DIG. 1, DIG. 2, DIG. 5, DIG. 6

[56] References Cited

U.S. PATENT DOCUMENTS

| | | | |
|---|---|---|---|
| 4,462,642 | 7/1984 | Leiber | 303/113 SS |
| 4,620,750 | 11/1986 | Leiber | 303/113 SS |
| 4,861,116 | 8/1989 | Bernhardt et al. | 303/113 TR |
| 5,002,345 | 3/1991 | Becker | 303/113 R |
| 5,039,176 | 8/1991 | Hellmann et al. | 303/119 |

FOREIGN PATENT DOCUMENTS 1946134 12/1977 Fed. Rep. of Germany ... 303/113 R

*Primary Examiner*—Robert J. Oberleitner
*Assistant Examiner*—Alfred Muratori
*Attorney, Agent, or Firm*—Felfe & Lynch

[57] ABSTRACT

Single drive slip control system for starter aid in which a slipping wheel is made to slow down to a speed approaching that of the other wheel. The brake line between the master cylinder and the wheel cylinder of each driven wheel is interrupted by a valve arrangement with an electrovalve, and further by a pressure generator downstream of the valve arrangement. When an evaluation circuit senses slippage of a driven wheel, the electrovalve is closed and the pressure downstream is increased. When pressure is produced by the master cylinder, the electrovalve is reopened. To ensure that the valve reopens, the valve arrangement includes a pressure controlled valve which is opened by a pressure build-up in a control chamber connected to the master cylinder through a check valve. A throttle valve in parallel with the check valve permits pressure reduction in the control chamber after braking.

6 Claims, 2 Drawing Sheets

FIG. 1
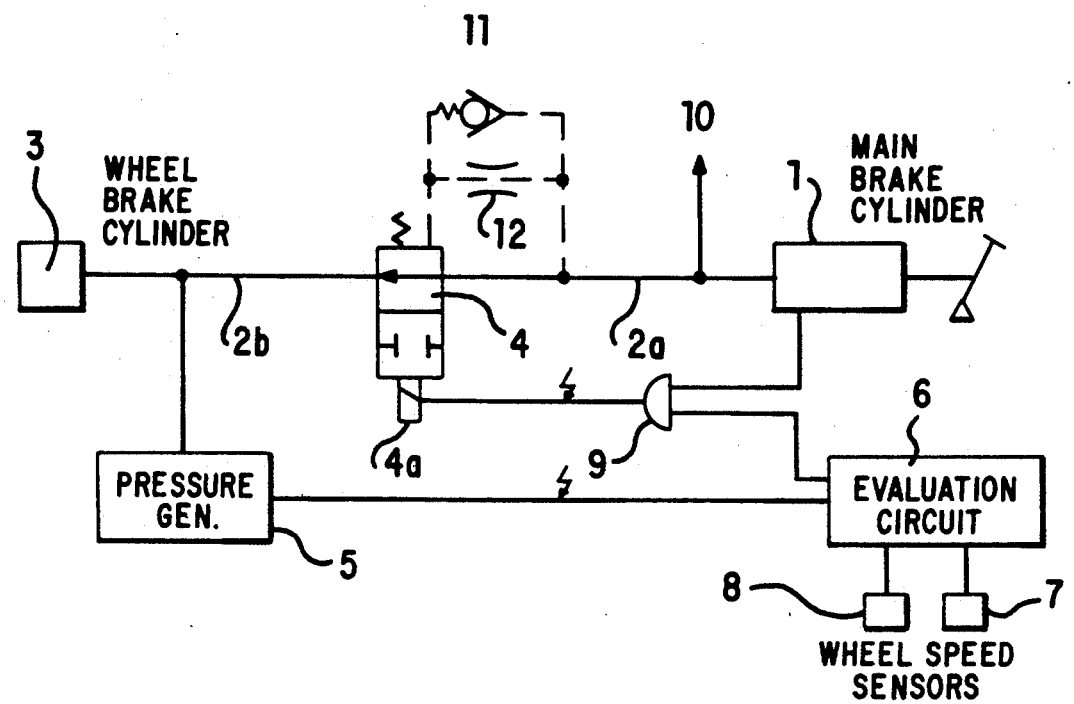
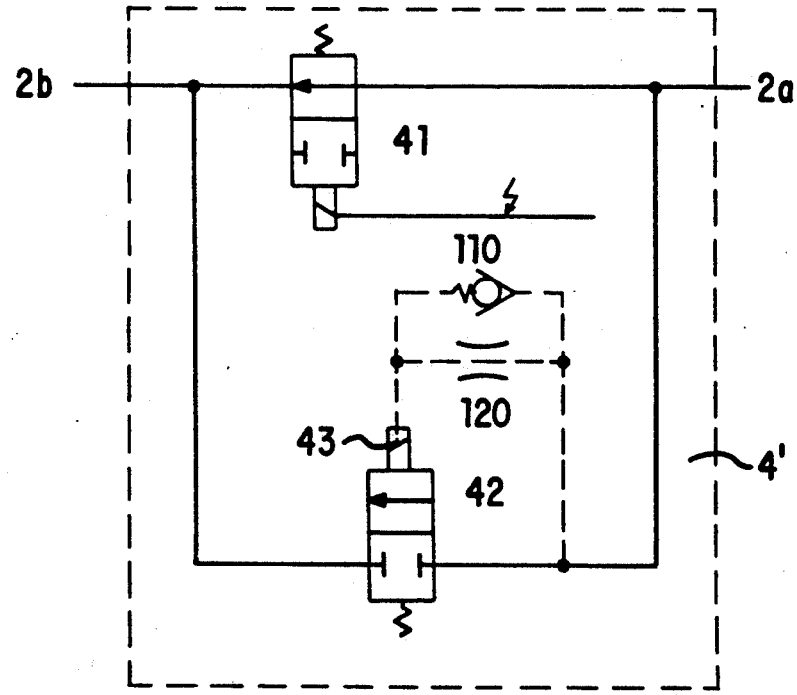
FIG. 2

DRIVE SLIP CONTROL SYSTEM HAVING ELECTRICALLY AND HYDRAULICALLY CONTROLLED VALVES

BACKGROUND OF THE INVENTION

The invention is based on a drive slip control system as known, for example, from product catalog "Hydraulik für Fahrzeuge" HB49109DA. The known ASR and the one in accordance with the invention are not to be considered a user-friendly ASR but rather as a starter aid to prevent slipping of the wheels and to maintain the rotational speeds at approximately the same level as is done by a locking differential.

Depending on the design of the brake circuit, the system includes two rotational speed sensors at the two driven wheels, one or two pressure generators, two or three magnetic valves and an electronic unit. If, during departure and travel, the rotational speed of one of the driven wheels exceeds the speed of the other driven wheel by a certain amount, a blocking of the brake line between pressure generator and main brake cylinder as well as the action of a pressure generator make the faster rotating and faster slipping wheel slow down until a difference in the rotational speeds falls below a certain threshold.

SUMMARY OF THE INVENTION

The ASR with the features of the invention ensures that brake pressure can be built up and reduced by using the main brake cylinder even in case of a system failure, namely when the valve sticks or in case of an erroneous activation which causes the brake line to remain open despite braking action. This applies in particular when the pressure generator is not equipped with a fail-safe function which is the case, for example, in a pressure generator where an electromotor drives an actuating piston via a self-locking threaded spindle. Moreover, the ASR in accordance with the invention can be upgraded.

BRIEF DESCRIPTION OF THE DRAWINGS

FIG. 1 is a first example of an ASR in accordance with the invention,

FIG. 2 is a possible design for the valve arrangement and

In FIG. 1, the main brake cylinder 1 of a vehicle is connected to a wheel brake cylinder 3 of a driven wheel 50 via brake line 2a, 2b. A valve arrangement 4 is interposed in the brake line between segments 2a and 2b. A pressure generator 5 is connected to the brake line segment 2b between the valve arrangement 4 and the wheel brake cylinder 3. When activated, it continuously supplies pressure to the segment 2b. It includes, for example, an activating piston driven by an electromotor via a threaded spindle.

Figure 3:
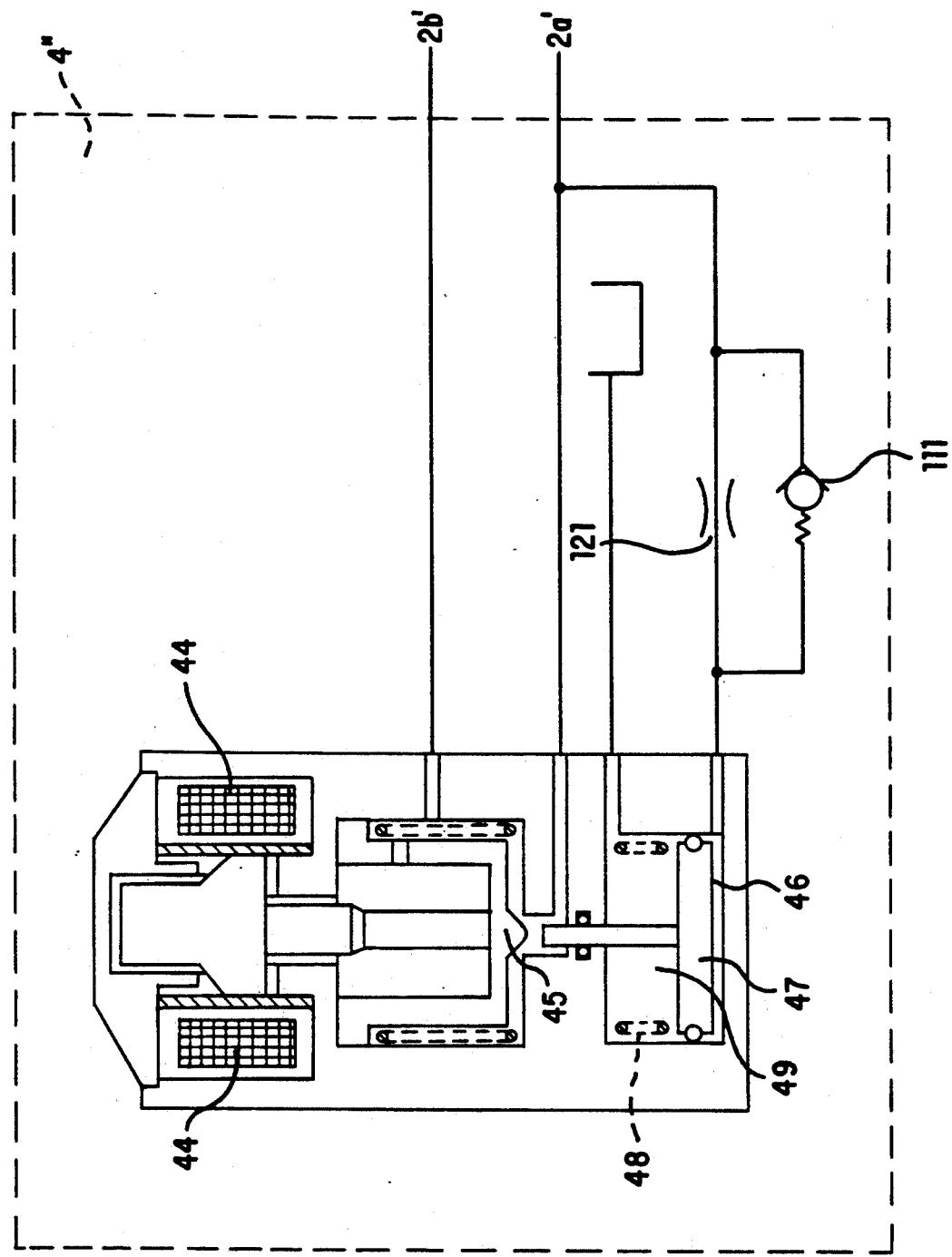
FIG. 3 is an integrated design of the valve arrangement.

The signals of the sensors 7 and 8 which depend upon the speed of the driven wheels are supplied to an evaluation circuit 6 which, in case the rotational speeds greatly deviate, supplies via an AND-gate 9 a signal to the magnetic coil 4a of the valve arrangement. The brake line 2a/2b is then interrupted. An output signal of the evaluation circuit 6 is at the same time supplied to the pressure generator 5. The latter then continuously increases the pressure in the segment 2b until the rotational speeds are balanced. The valve arrangement 4 remains closed until the drive slip control procedures are completed. An arrangement 10 for the other driven wheel which corresponds to the arrangement of the components 3, 4, 5 and is connected to the main brake cylinder (so called black-white brake circuit arrangement).

When the main brake cylinder is activated a signal is generated which interrupts the signal to the valve arrangement 4 and the brake line 2a/2b is reopened.

If the valve 4 were not released or if the signal of the AND-gate 9 were erroneously not terminated, it would not be possible to build up or reduce pressure at the wheel. In order to avoid this disadvantage, the valve arrangement 4 includes a pressure dependent component which is put into action via a selector valve 11 when pressure is built up in the main brake cylinder 1. The valve arrangement 4 is then open. The pressure built up for this purpose in the valve arrangement can be reduced only very slowly via a throttle 12 when the brake pressure is reduced so that it remains dominant, for example, over the still present actuation signal of the magnetic coil 4a. The valve arrangement remains open so that a complete brake pressure reduction is made possible in the corresponding wheel brake cylinder.

In the embodiment of FIG. 2, the valve arrangement 4' includes a magnetic valve 41 and a pressure-controlled valve 42 where the control chamber 43 is connected to the brake line 2a via selector valve 110 and throttle 120.

FIG. 3 shows an integrated valve arrangement 4" where an electromagnet 44, when actuated, activates a valve body 45 and interrupts the connection between the parts 2a' and 2b' of the brake pressure line. Via a selector valve 111 and a throttle 121, a control chamber 46 is connected to segment 2a. If pressure is built up therein, a piston is moved against the action of a spring 48. This activates a plunger 49 which can lift the valve body 45 from its seat even when the electromagnet 44 is activated.

I claim:

1. A drive slip control system where, in case a driven wheel is slipping, first a brake line is interrupted by an electrically actuated valve arrangement which is interposed in the brake line between a first brake pressure source and a corresponding wheel brake cylinder and where, secondly, the brake pressure in a brake line segment between the valve arrangement and the wheel brake cylinder is continuously increased via a second brake pressure source until the drive wheel is no longer slipping and where the brake line is opened when the brake pressure is supplied by the first brake pressure source, characterized in that in addition to being configured as a magnetic valve which opens the brake line after a prompt by an electric signal, the valve arrangement is configured such that when brake pressure is generated by the first brake pressure source via a check valve, a control pressure is generated in the valve arrangement, this control pressure actuating the valve arrangement which in turn opens the brake line between the first brake pressure source and the wheel brake cylinder and that this control pressure can only be reduced via a throttle.

2. Drive slip control system in accordance with claim 1, characterized in that the valve arrangement includes a magnetic valve and a valve parallel thereto and controlled by the control pressure.

3. Drive slip control system in accordance with claim 1, characterized in that the valve arrangement includes a magnetic valve and a piston preceded by a control chamber where a movement of the piston moves the magnetic valve thus opening said magnetic valve.

4. Drive slip control system for vehicle having two driven wheel, a main brake cylinder, a wheel brake cylinder at each driven wheel, a brake line connecting said main brake cylinder to each said wheel brake cylinder, a valve arrangement dividing each said brake line into a first segment from said main brake cylinder and a second segment to the corresponding said wheel brake cylinder, and means for increasing the pressure in the second segment when the corresponding wheel is slipping by a predetermined amount, said valve arrangement comprising electrically actuated means for interrupting each said brake line when the corresponding wheel is slipping by said predetermined amount, check valve means for supplying a control pressure when pressure is built up in said main brake cylinder, means responsive to said control pressure for opening each said brake line, and throttle means parallel to said check valve means for reducing said control pressure when said pressure in said main brake cylinder is reduced.

5. Drive slip control system as in claim 4 wherein
said electrically actuated means comprises a magnetic valve, and
said means responsive to said control pressure comprises a pressure actuated valve in said brake line in parallel with said magnetic valve, said pressure actuated valve being opened in response to said control pressure.

6. Drive slip control system as in claim 4 wherein
said electrically actuated means comprises a magnetic valve, and
said means responsive to said control pressure comprises a control chamber having therein a piston with means for opening the magnetic valve when said control pressure is present in said chamber.

* * * * *